US012705633B2

(12) United States Patent
Pandit et al.

(10) Patent No.: US 12,705,633 B2
(45) Date of Patent: Aug. 11, 2026

(54) CONTEXTUALLY AWARE DEVICES AND MACHINE LEARNING-DRIVEN OPTIMIZATION SYSTEMS

(71) Applicant: TOSHIBA GLOBAL COMMERCE SOLUTIONS, INC., Durham, NC (US)

(72) Inventors: Akshay Kumar Pandit, Morrisville, NC (US); Manda Miller, Raleigh, NC (US); Kristen M. Chung, Cornelius, NC (US); Albert D. Bennah, Cary, NC (US); Ashley Wehr, Minneapolis, MN (US)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 96 days.

(21) Appl. No.: 18/403,602

(22) Filed: Jan. 3, 2024

(65) Prior Publication Data

US 2025/0217827 A1 Jul. 3, 2025

(51) Int. Cl.

| | |
|---|---|
| ***G06Q 30/0202*** | (2023.01) |
| ***G07G 1/14*** | (2006.01) |
| *G16Y 10/45* | (2020.01) |
| *G16Y 40/20* | (2020.01) |

(52) U.S. Cl.

CPC ........... *G06Q 30/0202* (2013.01); *G07G 1/14* (2013.01); *G16Y 10/45* (2020.01); *G16Y 40/20* (2020.01)

(58) Field of Classification Search

CPC ........... G07G 1/00–145; G06Q 30/0202–0204

See application file for complete search history.

(56) References Cited

U.S. PATENT DOCUMENTS

| | | | | |
|---|---|---|---|---|
| 6,213,395 | B1 * | 4/2001 | Dejaeger | G07G 1/0045 235/383 |
| 7,689,394 | B2 * | 3/2010 | Furem | E02F 9/267 703/8 |
| 7,841,522 | B2 * | 11/2010 | Fortenberry | G07G 1/0054 235/383 |
| 7,866,546 | B1 * | 1/2011 | Vance | G07G 1/0009 235/383 |
| 9,928,697 | B2 * | 3/2018 | Yu | G07G 1/0009 |
| 9,971,919 | B1 * | 5/2018 | Lavery | G07G 1/0036 |
| 10,402,870 | B2 * | 9/2019 | Hogg | G06Q 20/202 |
| 11,373,476 | B1 * | 6/2022 | Crandall | G07D 11/30 |

(Continued)

FOREIGN PATENT DOCUMENTS

WO WO-2020176074 A1 * 9/2020 ........... G06Q 20/204

OTHER PUBLICATIONS

"Scales and Self-checkouts to Identify Weighted Goods Faster" by Skolkovo Institute of Science and Technology, Sep. 4, 2023, TechXplore, (Year: 2023).*

*Primary Examiner* — Rutao Wu
*Assistant Examiner* — Scott M Ross
(74) *Attorney, Agent, or Firm* — Patterson + Sheridan, LLP; Gero G. McClellan

(57) ABSTRACT

Techniques for intelligent system optimization are provided. Capacity data of one or more exit devices at a physical location is received. Demand data that indicates a current demand for exit service at the physical location is received from one or more monitoring devices. A decision is generated based on the capacity data and the demand data using a machine learning (ML) model. Commands corresponding to the decision are transmitted to the one or more exit devices for implementation.

18 Claims, 7 Drawing Sheets

(56) References Cited

U.S. PATENT DOCUMENTS 11,573,851 B2 * 2/2023 Roy .................... G06F 11/0754
12,567,050 B2 * 3/2026 Brosnan ............... G06Q 20/203
2003/0110082 A1 * 6/2003 Benson ................ G06Q 20/202
705/21
2005/0050647 A1 * 3/2005 Tanaka .................... D06F 34/05
68/3 R
2008/0015956 A1 * 1/2008 Regard .............. G01G 23/3728
705/28
2010/0121701 A1 * 5/2010 Nguyen ............. G06Q 30/0238
705/17
2013/0085879 A1 * 4/2013 Edwards ............ G06Q 30/0281
705/23
2014/0180848 A1 * 6/2014 Argue ...................... G07G 1/01
705/16
2015/0127401 A1 * 5/2015 Hogg ................. G06Q 30/0281
705/7.15
2015/0350338 A1 * 12/2015 Barnett ................. H04L 67/143
709/203
2016/0292660 A1 * 10/2016 Yu ............................ G07G 1/12
2018/0293523 A1 * 10/2018 Bergdale ................ G06Q 50/40
2019/0213569 A1 * 7/2019 Hosp .................. G06Q 20/3226
2019/0318064 A1 * 10/2019 Paladino ............. G06F 11/3006
2021/0365897 A1 * 11/2021 Bansal ................. G07G 1/0009
2022/0358483 A1 * 11/2022 Kohno ................. G06Q 20/202
2023/0123576 A1 * 4/2023 Gu ................... G06Q 20/38215
705/74
2023/0230382 A1 * 7/2023 Stewart .................. G06V 10/98
382/103
2024/0177089 A1 * 5/2024 Nagarajan ................ G06N 3/08
2025/0173650 A1 * 5/2025 Shankel ................. G06Q 50/12

* cited by examiner

CONTEXTUALLY AWARE DEVICES AND MACHINE LEARNING-DRIVEN OPTIMIZATION SYSTEMS

BACKGROUND

Internet-of-Thing (IoT) devices such as cameras, sensors, smart shopping carts, and Point of Sale (POS) systems are frequently installed in physical environments (e.g., retail stores) to help oversee the environment's operations. These IoT devices are utilized for a variety of functions, such as tracking user movements, overseeing supply chain and inventory, and monitoring store efficiencies, with each collecting different types of data. The massive amounts of data collected by these IoT devices can be transmitted through a mesh network to a central server or between the devices themselves.

DETAILED DESCRIPTION

Figure 1A:
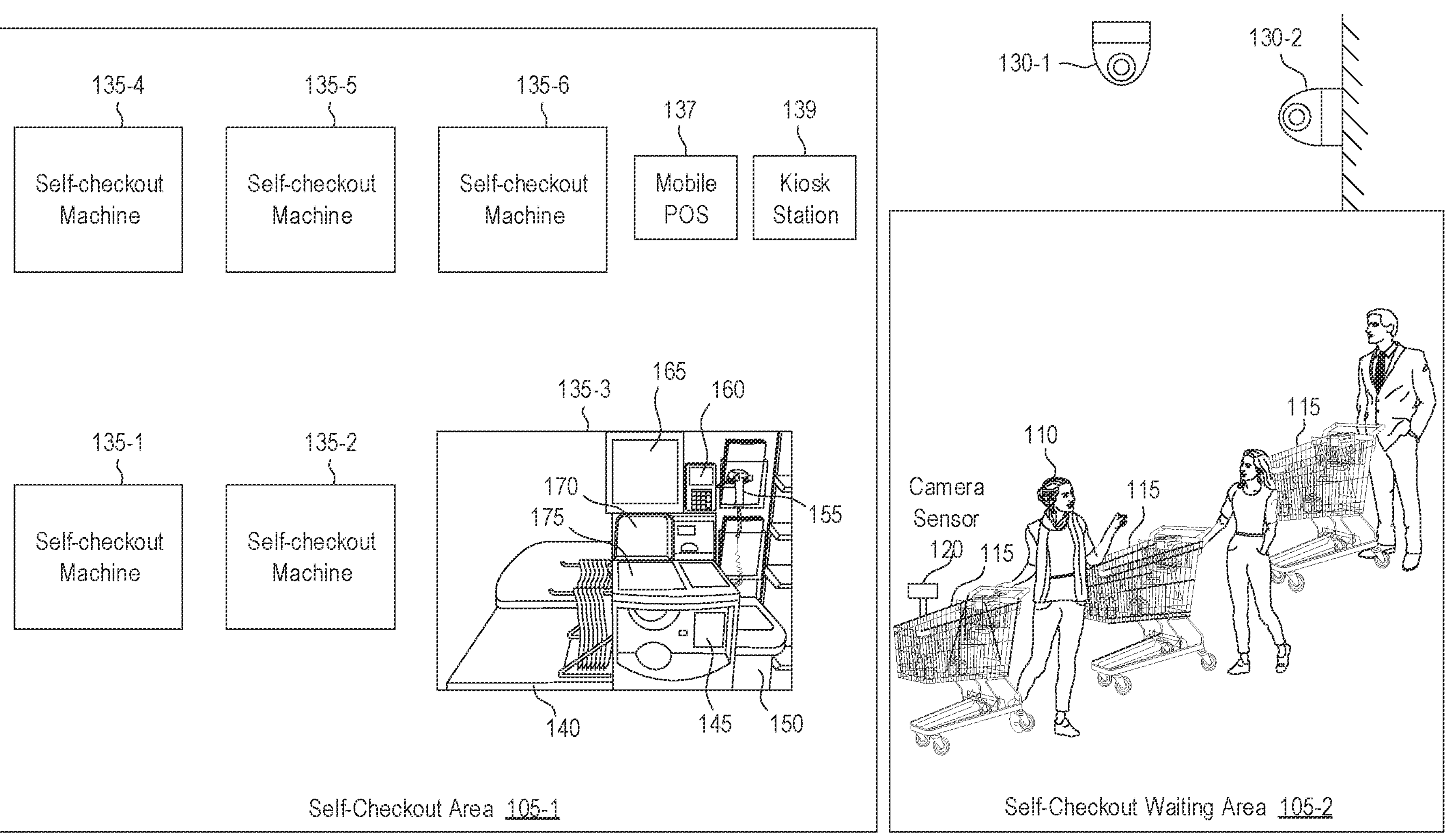
FIGS. 1A and 1B depict an example environment for collecting data from contextually aware IoT devices for optimization analysis, according to some embodiments of the present disclosure.

Embodiments of the present disclosure provide techniques for systematically analyzing data collected from various types of IoT devices within an operation system, coupled with the automatic generation of solution recommendations for optimizing the operation system using trained decision-making models.

In some embodiments of the present disclosure, a plurality of IoT devices are installed at an enterprise location (e.g., a retail establishment) to monitor and manage its operation. In some embodiments, the plurality of IoT devices can be conceptually divided into two categories based on their designated functions. The first category of IoT devices includes demand-monitoring devices, such as cameras and sensors (installed across the enterprise location), which are configured to monitor customer demand and activity within the premises. For example, cameras installed at the enterprise location can capture the number of customers waiting in checkout lines, and sensors on shopping carts can be used to track the quantity of products selected by customers. The data collected by these demand-monitoring devices (e.g., cameras, shopping cart sensors) are then utilized for analyzing immediate checkout demand at the enterprise location, and/or predicting future demand trends over any time window, such as demand in the next five minutes, in the next thirty minutes, in the next hour, and the like.

In some embodiments, the second category of IoT devices includes exit devices. In some embodiments, the exit devices may refer to any devices or system configured to facilitate or enable user in exiting a physical space or in finalizing a process, such has completing a checkout transaction. In some embodiments, the exit devices may include checkout devices, such as self-checkout machines, mobile POS devices, or self-service kiosk stations. During transactions, these devices can collect and report their current operational capacities (or efficiency ratings) as a percentage (e.g., 70%) of their rated capacities (or efficiency ratings) to a central system, allowing the system to dynamically monitor the status and performance of these devices and detect potential issues (e.g., such as when the reported capacities falls below a defined threshold). In some embodiments, each checkout device includes more than one component (e.g., a pin pad, a scale, a printer, a component to verify or authenticate payment information, and a monitor), whose performance directly influences the overall system capacity. In such configurations, these checkout devices (e.g., self-checkout machines) may collect and report the individual capacity data for each component, and provide the data for subsequent operational analysis.

In some embodiments, the demand data (e.g., queue lengths, item volumes per cart, and/or average waiting time per customer in checkout queues) and the capacity data (e.g., including the overall capacity data for each checkout machine, and/or the component-level capacity data for each individual component) are provided to a trained decision-making model. The model is configured to analyze the received capacity and demand data as inputs, and generate corresponding decisions that streamline or optimize the checkout operations at the enterprise location. In some embodiments, the system may control the operations of the checkout device(s) based on the demand in order to facilitate or improve the overall operations. For example, decisions generated by the model may include, but are not limited to, actions such as automatically rebooting underperforming checkout machines, decommissioning malfunctioning ones (along with rerouting customers to alternative checkout stations and/or generating alerts for maintenance or replacements), deactivating one or more components of a checkout machine (e.g., refraining from using a scale used to detect potential theft or fraud), and the like. In some embodiments, underperformance (or inefficiency) is detected on a component within a checkout machine, like a scale or a barcode scanner. The decisions or actions produced by the model may include initiating correction or optimization measures on the detected components, such as calibrating the scanner's settings or deactivating the loss prevention mechanism on the scale, to improve the component's functionality and efficiency. The decision-making model dynamically updates its outputs to optimize the checkout process by continuously monitoring the capacity and demand data at the enterprise location. In some embodiments, such an automated system allows for real-time responsiveness. As the data reflects changes in customer behaviors or checkout capacity, the model may automatically modify its recommendations to ensure an efficient and streamlined operation at the enterprise site.

In some embodiments, the decision-making model further integrates additional contextual data to enhance the accuracy of its recommendations. Contextual data may include information such as the time and/or the date when the capacity and/or demand data are collected, as this may affect customer flow with variations observed between peak hours and off-peak hours, and/or between weekdays and weekends. Additionally, the presence of any special events, holidays, or promotions may also affect the customer flow and behavior. In some embodiments, the data related to special events may also be considered by the model before generating a decision. Such contextual data allows the model to adjust its decisions dynamically and responsively to align with expected fluctuations in store activity.

In some embodiments, after the decision(s) are implemented by the checkout devices (e.g., self-checkout machines), the decision-making model uses demand-monitoring IoT devices (e.g., cameras or sensors) to monitor the effectiveness of the implemented decision(s). In some embodiments, the effectiveness can be measured by observing changes in demand or capacity data, such as increased or decreased operational capacities of checkout machines, increased or decreased moving rates of the checkout queues, reduced or increased queue lengths, or reduced or increased average waiting time. These parameters reflect changes in the checkout process in real-time and can provide feedback to the model. After that, the model may update its algorithms and parameters based on the post-implementation data to further improve its accuracy and efficiency.

Figure 1B:
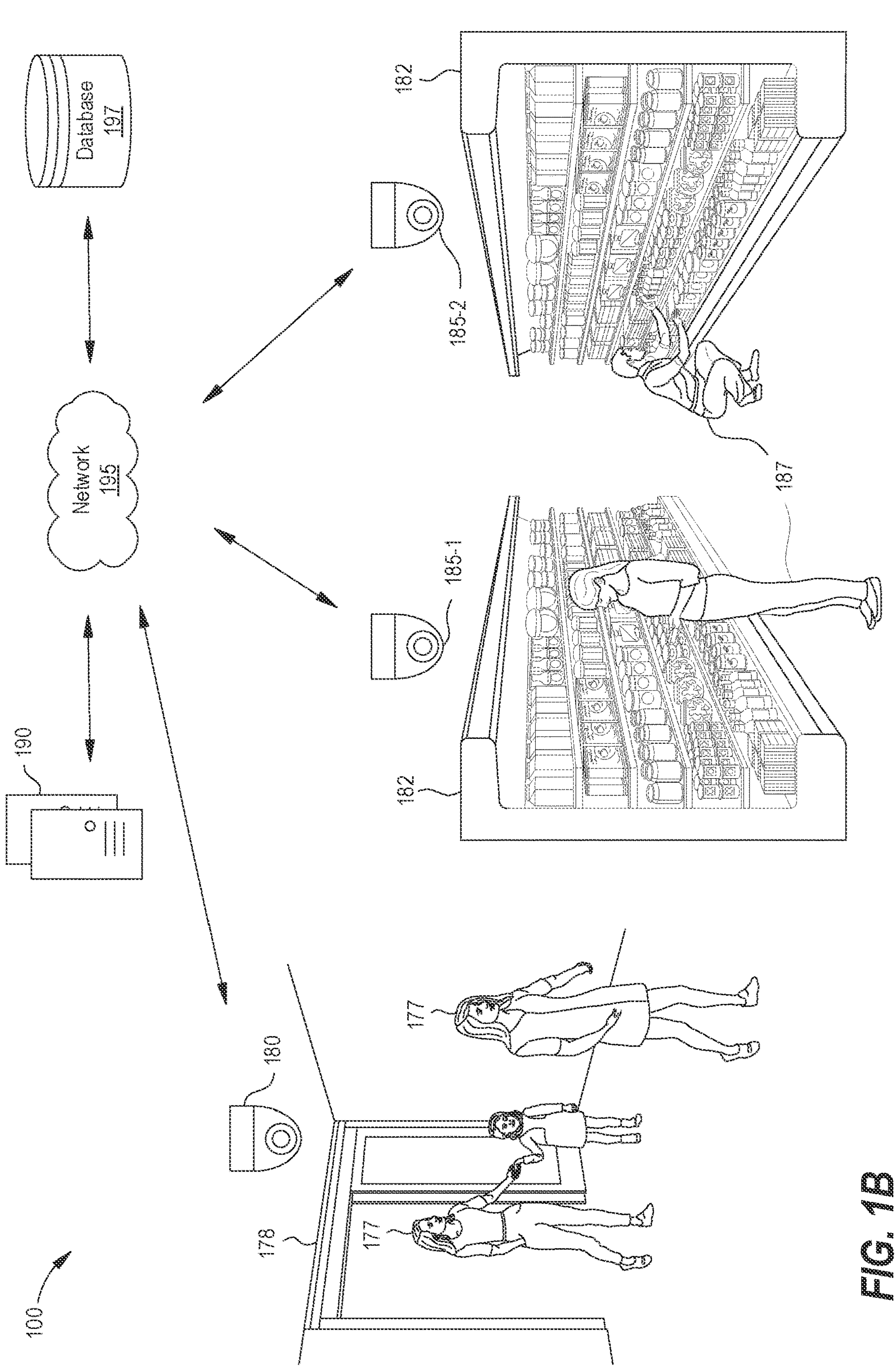

FIGS. 1A and 1B depict an example environment for collecting data from contextually aware IoT devices for optimization analysis, according to one embodiment disclosed herein. In the illustrated example, the environment 100 includes one or more cameras (including queue-monitoring cameras 130 as depicted in FIG. 1A, and entrance cameras 180 and/or in-store cameras 185 as depicted in FIG. 1B), one or more smart shopping carts 115 as depicted in FIG. 1A, one or more checkout machines (including self-checkout machines 135, mobile POS devices 137, and/or self-service kiosk stations 139 as depicted in FIG. 1A), one or more servers 190 as depicted in FIG. 11B, and a database 197 as depicted in FIG. 1B. In some embodiments, one or more of the illustrated devices may be a physical device or system. In other embodiments, one or more of the illustrated devices may be implemented using virtual devices, and/or across a number of devices.

In the illustrated example, one or more queue-monitoring cameras 130 are installed around the self-checkout waiting area 105-2 at an enterprise location (e.g., a retail store). In some embodiments, the queue-monitoring cameras 130 may be ceiling-mounted or pole-mounted, with freestanding poles or poles attached to self-checkout solution (e.g., 130-1) directly above the checkout queue(s) to capture a top-down view of the queue(s). In some embodiments, the queue-monitoring cameras 130 may be wall-mounted (e.g., 130-2) to capture a side view of the queue(s), which can provide a clearer image of the customer activity within the queue(s). To obtain a comprehensive view of the checkout queue(s), in some embodiments, more than one queue-monitoring camera 130 may be utilized, capturing the checkout queue(s) from different perspectives. The multi-angle approach may improve the accuracy in the data.

In some embodiments, images may be generated by the queue-monitoring cameras 130. In some embodiments, depending on the requirements and setting of the system, other forms of visual representations may be utilized, such as live footage (that offers real-time monitoring videos), thermal imaging (that can detect the presence of individuals based on heat signature), time-lapse photos (that capture images at certain intervals to show how the queue changes over time), and the like. The visual data captured by the queue-monitoring cameras 130 may then be processed by a data processing module, which is configured to identify various parameters that represent the current checkout demand at the enterprise location, such as queue length (e.g., the number of customers 110 in the queue), the average waiting time for each individual in the queue, the queue movement (e.g., the moving rate of the queue), and the number of items per cart and/or in the checkout queue. In some embodiments, the parameters, such as the number of people waiting in the queue or the number of items per cart and/or in the queue, may be determined by using object recognition technologies. This may involve using trained machine learning (ML) models to analyze the visual data and accurately identify and count individual items and people. In the context of a retail environment, the ML models may be trained on large datasets containing various images of items and people in different settings and conditions. For example, in some embodiments, for the purpose of correctly identifying the number of items per cart, the ML models may be trained to recognize different type of shopping items and distinguish them from one another and from the background. In some embodiments, the ML models may be trained to count the number of people in the queue by distinguish individual customers, even in situations where the customers are closely spaced or partially obscured.

In some embodiments, the queue-monitoring cameras 130 may be equipped with built-in processing capacity, which enables the cameras 130 to analyze the visual data and extract the relevant demand-related parameters locally. In some embodiments, the queue-monitoring cameras 130 may connect to a central server system 190 (e.g., which includes one or more servers) via a network 195. Using such a connection, the queue-monitoring cameras 130 may transmit the visual data to the central server 190 to calculate these demand-related parameters (e.g., queue length, average waiting time, and queue moving rate). The visual data and/or the generated demand-related data may be stored in database 197.

In the illustrated example, each customer 110 in the checkout queue has a smart shopping cart 115. The cart 115 contains the items 125 that each customer selected for purchase. In some embodiments, the number of items 125 within each cart 115 may affect the transaction time, and/or influence the speed at which a queue moves. In some embodiments, the data related to the volume or type of items in each cart may be considered when assessing the current demand for checkout service at the enterprise site.

In the illustrated example, each shopping cart 115 is equipped with one or more monitoring devices 120, such as sensors or cameras. The monitoring devices 120 are configured to identify and track items placed within each cart, and may include, but are not limited to, RFID readers (which detect RFID tags attached on products), barcode scanners (which can be used by customers to scan barcodes of products they selected), weight sensors, cameras, and the like. In some embodiments, weight sensors may be installed at the bottom of the carts 115 to detect changes in weight, which can be used to verify the addition or removal of products and therefore track the number of products placed within each cart. In some embodiments, built-in cameras may be installed on the carts 115 to capture their contents. The visual data may then be analyzed using image recognition techniques to identify and track items within each cart. In some embodiments, such as when the smart shopping cart 115 is equipped with a built-in processing unit, it may analyze the data collected by the variety of monitoring devices 120 (e.g., RFID readers, barcode scanners, weight sensors, and built-in cameras) in real-time to identify the volume or type of items within the carts. In some embodiments, the carts 115 may connect to a central server system 190 via the network 195. The collected cart data (including the sensor data and/or visual data captured by built-in cameras) may be transmitted to the central server 190 for processing and analysis, such as identifying the volume or type of items within each cart and/or aggregating the data across multiple carts waiting in the checkout queue, which, combined with queue length, can determine the current checkout demand at the enterprise location. In some embodiments, the collected cart data, once processed, may be stored in database 197.

In some embodiments, to accurately track the items per cart, a combination of stationary IoT devices and mobile devices may be used. In some embodiments, the stationary IoT devices may refer to sensors or cameras installed in the store, such as the cameras dedicated to queue monitoring (e.g., 130 of FIG. 1A), which provide a broad overview of contents of each cart. In some embodiments, the mobile IoT devices may refer to sensors or cameras integrated into the shopping carts (e.g., 120 of FIG. 1A), which are configured to capture the exact contents of each cart in real time. In some embodiments, either stationary or mobile IoT devices may be used exclusively, depending on the requirements and infrastructure of the retail environments.

In the illustrated example, the self-checkout area 105-1 include one or more IoT checkout devices (also referred to in some embodiments as exit devices), such as self-checkout machines 135, mobile POS devices 137, and self-service kiosk stations 139. As illustrated, each self-checkout machine 135 consists of multiple components working collectively to complete the checkout process. As illustrated, a self-checkout machine 135-3 includes a scanner area for customers to input their selected items (which may include one or more weight sensors to detect the addition or removal of items), a handheld barcode scanner 155 (e.g., wired or wirelessly connected to the self-checkout machine) for ease of scanning QR or barcode on the products, a pin pad 160 (also referred to in some embodiments as a payment terminal) for secure payment processing, a monitor 165 that displays the transaction detail, an integrated barcode scanner 170 to automatically read product barcode or QR code, a scale 175 for weighing items (e.g., to ensure accurate pricing based on weights), and a bagging area 140 where customers can place items after scanning (which may include one or more weight sensors to detect the addition or removal of items), and a printer 145 for receipts.

In the illustrated example, within a self-checkout machine 135-3, some of the individual components (e.g., the printer, scale, or barcode scanner) may have metrics that define their rated capacities (or efficiencies). In some embodiments, the rated capacity may refer to the level of performance or throughput that a component is designed or expected to achieve when operating under normal conditions/configurations. These components may be configured to report their current operation capacities (or efficiencies) as a percentage of the rated capacities, which can be used for monitoring and evaluating the overall status of a self-checkout machine. For example, in some embodiments, the printer's 145 capacity may be represented by the number of receipts and/or the amount of text it can print per minute. The printer may report its current capacity, for example, indicating it is operating 70% of its rated capacity due to a nearing end-of-roll or maintenance needed. In some embodiments, the scale's 175 efficiency may be represented by the speed at which it can stabilize and generate a final weight reading after items are placed on it, and/or the accuracy of such weights. The scale 175 may report a decreased efficiency (e.g., 80% of its rated efficiency) if it requires recalibration, experiences a malfunction that affects its sensitivity and accuracy, or if its loss prevention mechanisms are activated frequently. In some embodiments, the capacity of the barcode scanner 170 may be measured by its response time or accuracy percentage. If the scanner lens is dirty or if the scanner is experiencing technical issues, a decreased capacity may be reported. In some embodiments, the capacity of a pin pad 160 may be characterized by its transaction processing time or error rate. The pin pad 160 may report its capacity as a percentage of its rated capacity, such as 60%, when experiencing hardware malfunctions, software issues, or network latency that affects transaction authorization.

In some embodiments, the overall capacity (or efficiency rating) of the self-checkout machine 135 may be calculated based on the data received from each individual component/device within the system. Each device (e.g., the pin pad, the scale, the integrated barcode scanner, the handheld barcode scanner, and the printer) reports its current capacity (or efficiency) as a percentage of its rated performance. The individual capacity (or efficiency) data may then be integrated to generate the overall capacity (or efficiency rating) of the self-checkout machine 135. In some embodiments, the capacity (or efficiency) data from each individual device within the self-checkout machine 135 may be weighted according to its relative importance or usage frequency before being aggregated. This approach ensures that devices that are important to the checkout process (e.g., the pin pad for payment processing, without which the checkout cannot be completed) or those that are used more frequently (e.g., the barcode scanner for item identification) have a proportionately greater impact on the overall efficiency calculation. The resulting overall capacity (or efficiency rating) of the self-checkout machine 135 thus provides a more accurate representation of its ability to handle the checkout demand at the enterprise location.

In some embodiments, the data processing and analysis, such as calculating the overall capacity for each checkout machine, may be performed locally (e.g., at the self-checkout machine 135). In some embodiments, since the self-checkout machine 135 is linked to the central server system 190, the component-level capacity data may be transmitted via the network 195 for centralized processing and evaluation. In some embodiments, the component-level and/or the overall (machine-level) capacity data may be stored in the database 197 for further analysis.

In the illustrated example, one or more entrance cameras 180 are placed near the entrance 178 of the enterprise location (e.g., a retail store). The entrance cameras 180 are configured to capture visual data (e.g., images or videos) of the entrance and/or exit in real-time. Based on the visual data, the number of people 177 entering and/or exiting the store may be determined, which assists in analyzing store traffic patterns and/or trends in checkout demand. In some embodiments, the collected visual data may be analyzed locally by each entrance camera 180 if it has built-in processing capability. In some embodiments, the entrance cameras 180 may be connected to the central server system 190 (which includes one or more servers) via the network 195, and the visual data may be transmitted by the entrance cameras 180 to the central server 190 for more advanced processing, such as using image recognition techniques to identify the number of customers 177 entering the store and/or detect their behavior patterns (e.g., direction of movement, speed). In some embodiments, the visual data and the extracted parameters (e.g., the customer inflow) may be stored in the database 197 for further analysis (e.g., forecasting peak shopping time, fine-tuning the decision-making models).

In the illustrated example, one or more in-store cameras 185-1 and 185-2 are installed across the enterprise site (e.g., a retail store). The in-store cameras are configured to capture the overall customer count and movements within the store, such as the count of people 187 shopping in different sections of the store (but not yet waiting in checkout lines), the dwell time around certain products, and the flow of movement through the store. Similar to the queue-monitoring cameras 130 and the entrance cameras 180, the in-store cameras 185 may process data locally if equipped with sufficient computation power. In some embodiments, instead of processing the data locally, the in-store cameras 185 may transmit the visual data to the central server system 190 via network 195 for more complex analyses.

In the illustrated example, the central server system 190 consists of one or more servers, which can either be physical server hardware or based on a cloud computing platform. The central server system 190 may first aggregate data from a variety of IoT devices within the retail space, which can include, but are not limited to, cameras (e.g., queue-monitoring cameras 130, entrance cameras 180, and in-store cameras 185) that monitor checkout queues and store entries, smart shopping carts that track the contents of each cart, and checkout machines (e.g., self-checkout machines 135, mobile POS devices 137, self-service kiosk stations 139). Once data is collected (via the network 195), the server may process the data to extract relevant features that reflect both the current demand in the store and the capacity of checkout facilities. The data processing analysis may include using image recognition techniques to process visual data (collected from various cameras within the enterprise site). These techniques may be utilized to determine checkout queue lengths, monitor the number of customers at the site, track customer entries, and identify the volume or type of items in shopping carts. Upon determining these fundamental parameters, the server may perform more advanced analysis. For example, in some embodiments, the server 190 may calculate immediate checkout demand based on the observed queue lengths and the number of items each customer intends to purchase (which are inferred from the contents of their carts). In some embodiments, the server 190 may predict checkout trends by examining the inflow of customers entering the store and those actively shopping but not yet awaiting in checkout lines. These fundamental parameters/metrics, such as queue lengths and item counts, and the advanced parameters/metrics, such as the predicted checkout influx, may constitute demand data that reflects the immediate and predicted checkout demand of the store.

In some embodiments, such as when component-level capacity data is reported, the server 190 may assess the overall capacity (or efficiency rating) of a checkout machine by aggregating the component-level data. In some embodiments, the server 190 may consider the context in which the demand data and capacity data are collected to ensure accurate analysis. The server 190 may retrieve supplemental information (e.g., including the date or time when the data was recorded) from the database 197 or the IoT devices, and identify contextual factors, such as the data was collected during a weekday or weekend, peak hours or off-peak hours, or occurrence of special events (e.g., Black Friday) that may affect shopping patterns.

In some embodiments, the central server 190 may provide the data gathered—demand data, capacity data, and/or contextual data—as inputs to trained decision-making models. Various machine learning (ML) algorithms, such as decision trees, random forests, and/or neural networks, may be used by the models to perform predictive analysis. The outputs of the models may include decisions or recommendations to optimize store operations. The decisions or recommendations produced by these models may be proactive or remedial, and may include, but are not limited to, prompting to reboot underperforming checkout machines or components therein (e.g., self-checkout machine 135, mobile POS device 137, or self-service kiosk stations 139) automatically to resolve transient issues, and temporarily decommissioning machines (or components therein) that are underperforming along with redirecting customers to other more efficient machines to prevent bottlenecks. When inefficiencies are identified on certain components within a checkout machine, the recommendations produced by the models may include instructions to initiate correction or optimization measures on these components (e.g., recalibrating a scale or deactivating its loss prevention mechanisms). The generated decisions or recommendations may then be transmitted by the central server 190 to the checkout IoT devices (e.g., self-checkout machine 135, mobile POS device 137, or self-service kiosk stations 139) for immediate implementation. Subsequent to the implementation, the server 190 may continue to monitor the demand and/or capacity data to evaluate the effectiveness of the implemented strategies. Any changes in the demand and/or capacity data (e.g., shorter queue length, reduced average waiting time, increased capacities) may be detected and analyzed to determine the impact of the decisions and/or update the trained ML models.

Figure 2:
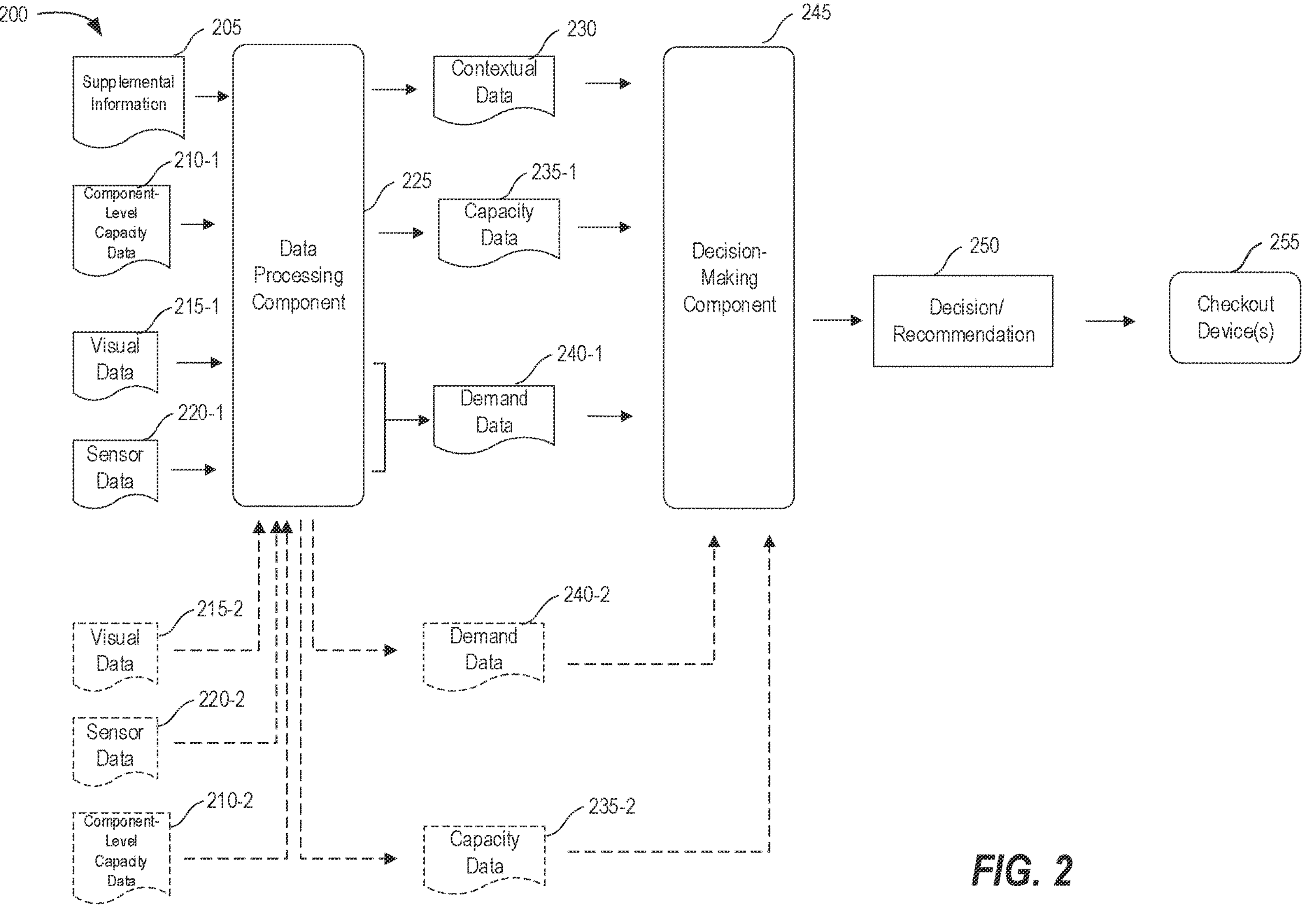
FIG. 2 depicts an example of workflow for optimizing checkout operations using IoT devices and machine learning, according to some embodiments of the present disclosure.
Figure 6:
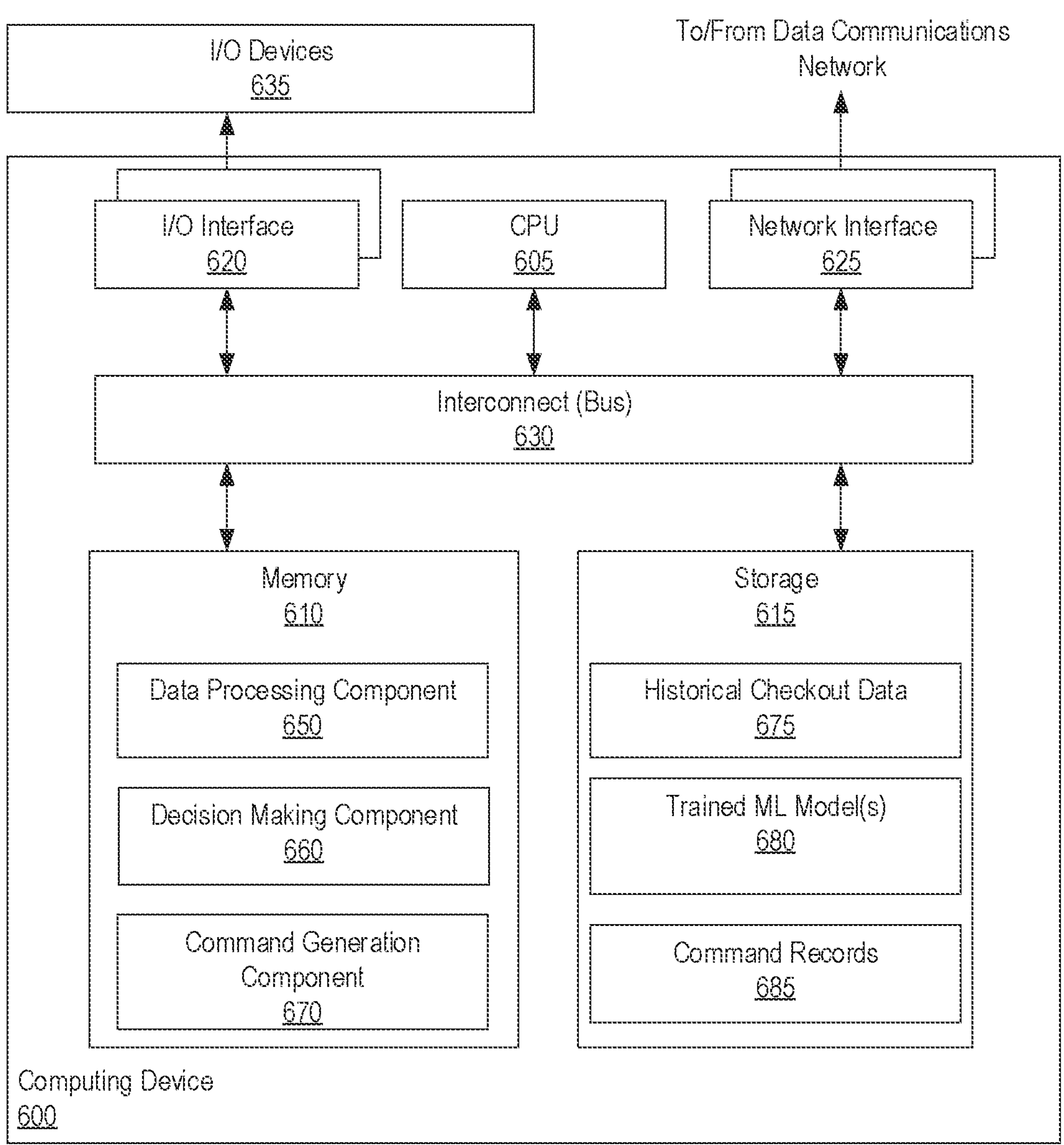
FIG. 6 depicts an example computing device configured to perform various aspects of the present disclosure, according to some embodiments of the present disclosure.

FIG. 2 depicts an example of workflow 200 for optimizing checkout operations using IoT devices and machine learning, according to some embodiments of the present disclosure. In some embodiments, the workflow 200 may be performed by one or more computing systems, such as the central server 190, the self-checkout machine 135, the mobile POS device 137, and the self-service kiosk station 139 as illustrated in FIGS. 1A-1B, and/or the computing device 600 as illustrated in FIG. 6.

In the illustrated example, supplemental information 205, component-level capacity data 210-1, visual data 215-1, and sensor data 220-1 are provided to the data processing component 225. By processing the variety of input data, the data processing component determines checkout demand 240-1, checkout facility capacities (or efficiency ratings) 235-1, and relevant contextual factors 230 at an enterprise location (e.g., a retail store).

In some embodiments, the enterprise site may include different types of IoT-enabled checkout devices, such as self-checkout machines (e.g., 135 of FIG. 1A), mobile POS devices (e.g., 137 of FIG. 1A), and self-service kiosk stations (e.g., 139 of FIG. 1A). The component-level capacity data 210-1 may refer to the performance metrics of each individual component within an IoT-enabled checkout device (also referred to in some embodiments as exit devices). For example, a self-checkout machine may consist of multiple components, including but not limited to a printer (e.g., 145 of FIG. 1A), a handheld barcode scanner (e.g., 155 of FIG. 1A), a pin pad (e.g., 160 of FIG. 1A), a monitor (e.g., 165 of FIG. 1A), an integrated barcode scanner (e.g., 170 of FIG. 1A) and a scale (e.g., 175 of FIG. 1A). The component-level capacity data 210-1 may include the capacity data reported by the printer, the scale, the pin pad, the barcode scanner, or other individual components within the self-checkout machine. In some embodiments, the component-level capacity data 210-1 may be represented as a percentage of the component's rated capacity. For example, a pin pad's operational capacity may be evaluated by its average transaction processing time, and the pin pad within a self-checkout machine may report its current capacity as a percentage of its rated capacity (e.g., 70%). In some embodiments, the rated capacity may refer to the level of performance or throughput that a component or device is designed or expected to achieve when operating under normal conditions/configurations.

When the reported capacity falls below a defined threshold, an alert may be triggered and the system may determine that the pin pad is experiencing potential issues such as hardware malfunctions, software glitches, or network delays. The capacity data 210-1 reported by each individual component within a self-checkout machine may then be aggregated by the data processing component 225 to compute the overall capacity of the self-checkout machine. In some embodiments, when calculating the overall capacity, the capacity data 210-1 reported by each individual component may not be treated equally in aggregation. In some embodiments, the capacity data 210-1 may be weighted by the importance and/or usage frequency of each component (e.g., where the capacity of the pin pad may be given a higher weighting factor because, without it, the checkout cannot be completed), to ensure the final aggregated capacity data accurately reflects the operational status of the checkout machine. As illustrated, the capacity data 235-1 may include the overall capacity for each IoT-enabled checkout device (e.g., self-checkout machine 135, mobile POS device 137, self-service kiosk station 139 of FIG. 1A) calculated based on the reported component-level capacity data 210-1. The capacity data 235-1 are then provided to a decision-making component 245. In some embodiments, the data processing component 225 may consolidate the component-level capacity data 210-1 with the corresponding overall capacity data, and provide the data collectively to the decision-making component 245 for more granular and accurate analysis.

In the illustrated example, the visual data 215-1 (e.g., images or videos) includes a range of inputs captured by cameras (e.g., queue-monitoring cameras 130, entrance cameras 180, and/or in-store cameras 185 of FIGS. 1A-1B) located across an enterprise location (e.g., a retail store). The visual data 215-1 is provided to the data processing component 225, which analyzes the data (e.g., using image recognition techniques) to identify a variety of parameters related to the checkout demand at the enterprise location. For example, the data processing component 225 may quantify the inflow of customers (e.g., the number of customers entering the premises) and/or outflow of customers by processing the visual data gathered by entrance cameras (e.g., 180 of FIG. 1B). Cameras placed near checkout queues (e.g., 130 of FIG. 1A) may provide a stream of visual information about the checkout queue, which, upon analysis, allows the data processing component 225 to determine the queue lengths (e.g., the count of customers awaiting checkout), the average waiting time, the moving rate of the queue, and other relevant metrics. Additionally, additional in-store cameras may be installed at the enterprise site beyond the checkout and entrance areas (e.g., in-store cameras 185 of FIG. 11B). By processing the visual data captured by these additional in-store cameras, the data processing component 225 may determine the number of customers who are actively shopping around at the premises but have not yet proceeded to checkout lines.

In some embodiments, the visual data 215-1 may also include data collected by cameras integrated into smart shopping carts (e.g., 115 of FIG. 1A). By processing the data collected by these integrated cameras, the data processing component 225 may learn the quantity and/or type of items placed within each cart, especially for those awaiting in checkout lines. In some embodiments, such as when the smart shopping carts utilize sensors (e.g., RFID readers, barcode scanners, weight sensors) in addition to or instead of integrated cameras to monitor cart contents, the sensor data 220-1 may also be collected and analyzed by the data processing component 225 to determine the quantity and/or type of items each cart contains.

The various parameters extracted from the visual data 215-1 and sensor data 220-1—such as queue lengths, the number of items awaiting checkout, customer inflow, and in-aisle customer numbers—constitute demand data 240-1 (also referred to in some embodiments as pre-implementation demand data), which is provided to the decision-making component for further processing and analysis. In some embodiments, the parameters such as the queue lengths and the number of pending checkout items within each cart, when analyzed collectively, may serve to determine the current checkout demand at the enterprise location. In some embodiments, the checkout demand may be quantified by a calculated metric, such as anticipated average waiting time for customers in the checkout queue. In some embodiments, the parameters, such as customer inflow and in-aisle customer numbers, may be used to determine the short-term trends in checkout demand at the enterprise location (e.g., an increase or decrease in checkout volume within the next few hours). The parameters within the demand data 240-1 that reflect the current checkout demand and/or predictive checkout trends serve as valuable inputs for a machine learning model trained to automatically generate recommendations to optimize store operations.

In the illustrated example, the supplemental information 205 may include records or documents that specify the exact time, date, or any occurrence of special events (which may significantly influence customer behavior and checkout demand) (e.g., Black Friday) when the capacity data 210-1, visual data 215-1, and/or sensor data 220-1 are collected. By processing the supplemental information 205, the data processing component extracts the contextual data 230, which includes identifiers that correspond to the circumstances under which the relevant data are collected. For example, if the supplemental information indicates that the data was collected during peak hours on a weekend with no special event taking place, the contextual data 230 may include identifiers such as "peak time, "weekend," and "no special event." The contextual data 230 is then provided to the decision-making component 245, to ensure the subsequent decision-making analysis is sensitive to temporal and event-based factors affecting store operations.

In the illustrated example, the contextual data 230, the capacity data 235-1 for each IoT-enabled checkout device, and the demand data 240-1 are provided to the decision-making component 245. Upon receiving the data, the decision-making component executes trained ML models to perform predictive analysis. The ML models are trained to interpret the various received data as inputs and automatically generate decisions or recommendations intended to improve checkout operations at the enterprise site. The ML models may use a range of ML algorithms, such as random forests, decision trees, neural networks, and more. Depending on the input data, the models may generate different decisions or recommendations 250 to optimize the checkout operations. For example, in some embodiments, if the input data indicates that a self-checkout machine is operating at a reduced capacity (e.g., falling below a defined threshold) during a period of low customer traffic—such as when the checkout queue is short (e.g., falling below a defined threshold) and relevant contextual factors indicate the capacity and demand data were collected during an off-peak time on a weekday—the model may generate a decision to decommission the underperforming self-checkout machine temporarily, and/or trigger notifications for on-site staff to direct waiting customers to other more efficient checkout machines. In some embodiments, if the input data indicates that a self-checkout machine is operating at a reduced capacity (e.g., falling below a defined threshold) during a period of high customer traffic—such as the checkout queue is long (e.g., exceeding a defined threshold) and relevant contextual factors indicate the capacity and demand data were collected during an peak time on a weekend or during a special event—the model may generate a decision to reboot the underperforming self-checkout machine or optimize the functionalities of certain components (e.g., updating the software within a pin pad, deactivating a scale's loss prevention mechanisms).

In some embodiments, the capacity data 210-1 reported by each separate component within a self-checkout machine, such as a pin pad's capacity, may be provided to the ML models as inputs for inference. The detailed component-level capacity data 210-1 may allow a more refined and accurate understanding of the health and functionality of each IoT-enabled checkout device. Based on the understanding, the model may generate tailored recommendations for implementing correction or optimization measures on certain components, such as calibrating a scale or rebooting a pin pad.

In some embodiments, a dataset comprising historical checkout operation scenarios may be collected and utilized for training the ML models. The dataset may include historical pre-implementation demand data (e.g., queue lengths, number of items in carts, customer influx, and in-aisle shopper numbers) and capacity data (e.g., individual capacity data reported by each component, or aggregated capacity data for each checkout device). In some embodiments, contextual data (e.g., time of day, day of the week, and occurrence of any special events) may also be integrated into the dataset as influential inputs. The target outputs for the model training may include the corresponding decisions that historically led to enhanced operational efficiency within those scenarios. The dataset may be split into a training dataset (to train the model), a validation dataset (to fine-tune the model), and a testing dataset (to evaluate the model's performance). The models may be trained to adjust their parameters to create a correlation between the inputs (e.g., historical demand data, historical capacity data, and historical contextual data) and the desired target outputs (e.g., implemented decisions that led to improved operational efficiency). In some embodiments, after the training phase, the models may be refined using the validation dataset, such as fine-tuning the parameters to prevent overfitting. In some embodiments, prior to training, the collected dataset may be cleaned and preprocessed, such as by removing missing values and normalizing numerical values, to ensure an efficient and effective training process.

In the illustrated example, the decision-making component 245 generates a decision or recommendation 250 based on the received capacity data 235-1, the demand data 240-1, and/or the contextual data 230. As discussed above, the decisions produced by the decision-making component may include actions aimed at improving the operational efficiency in checkout. The decision or recommendation 250 may include, but are not limited to, rebooting underperforming checkout machines, temporarily taking malfunctioning checkout machines offline (along with rerouting customers to alternative checkout stations and flagging the machines for maintenance or replacement), and initiating correction or optimization measures at the component level when underperformances (or inefficiencies) are detected on certain components. The decision or recommendation 250 is then transmitted to the IoT-enabled checkout devices 255 (e.g., self-checkout machines 135, mobile POS devices 137, kiosk stations 139 of FIG. 1A) for implementation.

In the illustrated example, after the decision has been implemented by checkout devices 255 (e.g., an underperforming self-checkout machine has been rebooted), the data processing component 225 continuously monitors the effects or outcomes of the implementation, such as gathering visual data 215-2 and sensor data 220-2 from the checkout environment, and collecting individual capacity data 210-2 reported by each component within the IoT-enabled checkout devices (also referred to in some embodiments as exit devices). The data processing component 225 then processes the visual data 215-2 and sensor data and 220-2 to determine the relevant checkout demand 240-2 at the enterprise location subsequent to the decision's implementation. The data processing component 225 also updates the capacity profile for each IoT-enabled checkout device by calculating overall capacity data 235-2 based on the component-level capacity data 210-2 reported post-implementation.

In the illustrated example, the post-implementation demand data 240-2 and capacity data 235-2 are transmitted to the decision-making component 245. The decision-making component 245, upon receiving the post-implementation data, compares it against the pre-implementation data (e.g., 235-1 and 240-1) to determine the effectiveness of the implemented decision 250 in optimizing checkout operations. In some embodiments, the effectiveness of the implemented decision may be indicated by increased operation capacities (or efficiency ratings) of checkout devices, reduced checkout demand (e.g., decreased average waiting time for individuals awaiting in checkout lines, or a shorter queue length), or other positive changes. If the comparison reveals that the decision is effective in optimizing checkout operations (e.g., indicated by reduced average waiting time), the decision-making component 245 may record the implemented decision as a successful intervention, and use it to reinforce the model's learning. If the outcomes of the implemented decision show no improvements (e.g., indicated by negligible changes in capacity or an expected rise in checkout demand), the decision-making component 245 may mark the implemented decision as unsuccessful, and update the model (e.g., adjusting its parameters or weights) to improve its predictive accuracy for future decisions.

Figure 3:
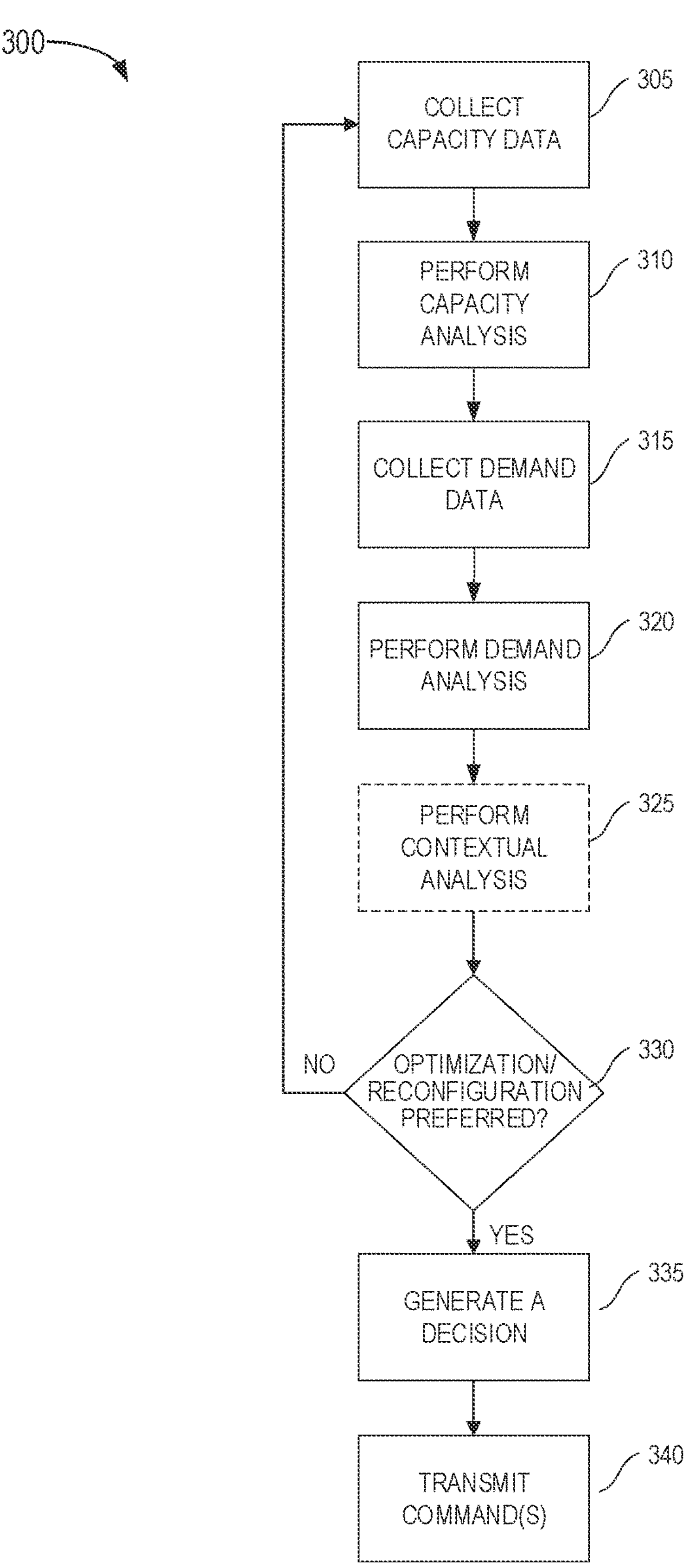
FIG. 3 depicts an example method for generating decisions for optimizing checkout operations using trained decision-making models, according to some embodiments of the present disclosure.

FIG. 3 depicts an example method 300 for generating decisions for optimizing checkout operations using trained decision-making models, according to some embodiments of the present disclosure. In some embodiments, the method 300 may be performed by one or more computing devices (e.g., a system that processes demand data, capacity data, and/or contextual data to generate an optimization decision), such as the central server 190, the self-checkout machine 135, the mobile POS device 137, and the self-service kiosk station 139 as illustrated in FIGS. 1A-1B, and/or the computing device 600 as illustrated in FIG. 6.

The method 300 begins at block 305, where a computing system (e.g., 190 of FIG. 1B) collects capacity data from each IoT-enabled checkout device (e.g., self-checkout machine 135, mobile POS device 137, and self-service kiosk station 139 of FIG. 1A) (also referred to in some embodiments as exit devices) at an enterprise location (e.g., a retail store). In some embodiments, the checkout devices may measure and report their current operational capacities as a percentage of their rated capacities (e.g., 85%). Using the capacity percentage, the computing system may set a threshold, and when the reported capacity falls below the threshold, it may indicate that the checkout device encounters potential issues and/or maintenance or replacement is required. Instead of or in addition to overall capacity, in some embodiments, devices with multiple components (e.g., a barcode scanner, a printer, a pin pad, or a scale) may report data on the status and performance of each individual component. For example, a self-checkout station (e.g., 135 of FIG. 1A) may report the individual capacity (or efficiency) of its barcode scanner.

At block 310, the computing system performs capacity analysis. In some embodiments, such as when data from individual components is collected, the computing system may compile the component-level data (e.g., 210-1 of FIG. 2) to generate the overall capacity of each checkout device. In some embodiments, upon determining the overall capacity of each checkout device at the enterprise site (e.g., a retail store), the computing system may aggregate the data to assess the collective checkout capacity of the store.

At block 315, the computing system collects demand data from various devices, such as cameras (e.g., queue-monitoring cameras 130, entrance cameras 180, or in-store cameras 185 of FIGS. 1A and 1B) installed across the store (e.g., which are configured to monitor the checkout queues and other areas of the store), smart shopping carts with sensors and/or integrated cameras (e.g., 120 of FIG. 1A) (e.g., which are configured to track cart contents), and more.

At block 320, the computing system performs demand analysis. In some embodiments, the computing system may process the collected visual or sensor data (e.g., using image recognition techniques) to extract parameters or metrics indicative of checkout demand at the enterprise location, such as queue lengths, the number of customers entering the store, the number of customer actively shopping but not yet awaiting checkout, and the number or type of items within each cart. In some embodiments, advanced demand metrics may be calculated. For example, the system may calculate the current checkout demand based on the number of customers in the queue and the number of pending checkout items within each cart. In some embodiments, the extracted parameters, such as the number of customers entering the store and the number of customers actively shopping but not yet awaiting checkout, when analyzed collectively, may enable the system to predict the short-term trends in checkout demand (e.g., changes in checkout volume within the next few hours) at the store.

At block 325, the computing system optionally performs contextual analysis. For example, in some embodiments, the computing system may retrieve supplemental information from a database (e.g., 197 of FIG. 1B). The supplemental information may indicate the exact time, date, or any occurrence of special events (e.g., Black Friday) when the relevant capacity data and demand data are collected. The contextual factors identified may further be used to refine demand analysis and decision-making process.

At block 330, the computing system determines whether checkout optimization/reconfiguration is preferred considering the current demand, the predictive trends in customer patterns, the capacity reported by each checkout device, and/or the contextual factors. If the system determines that optimization/reconfiguration is preferred—such as when the checkout devices operating at their current capacities are unable to meet the current or predictively increasing demand—the method 300 proceeds to block 335. If the system concludes that optimization/reconfiguration is not preferred—such as when the current or predictively increasing demand is manageable by the checkout devices in their present states—the method 300 returns to block 305, where the system continues to track the capacity and demand data at the enterprise location. In some embodiments, the manageability of checkout demand may be determined by comparing the average checkout waiting time against a defined threshold (e.g., 5 minutes). If the calculated average waiting time exceeds the threshold, the system may infer that optimization/configuration is preferred. For example, if the defined threshold for average waiting time is set at 10 minutes, any duration above the threshold may be interpreted as negatively impacting the customer's shopping experience. In such situations, the system may consider implementing optimization/reconfiguration actions when the calculated average waiting time exceeds the 10-minute threshold. However, there are also scenarios where, despite detecting that one or more checkout devices are operating below their rated capacities and potentially slowing down the queue, the calculated average waiting time nevertheless falls below the defined threshold. This can be the case when the overall demand for checkout is relatively low. For example, if the system detects there are not many items in each customer's cart, it indicates a low processing load for each transaction. In such situations, even if individual machines are underperforming, the aggregated effect on the average waiting time may remain within acceptable limits, such as below the 10-minute threshold. Therefore, under such conditions/configurations, the system may determine there is no immediate demand for optimization/reconfiguration actions.

In some embodiments, the average checkout waiting time may be calculated based on the number of customers in the queue, the number of items in each cart (as recorded by sensors or cameras placed on smart shopping carts), and the average transaction time per item (which can be a dynamic value based on recent transaction data). In some embodiments, the defined threshold may be determined according to industry standards or requirements. In some embodiments, the defined threshold may be adjusted based on peak time or special events.

At block 335, the computing system runs trained ML models using capacity data, demand data, and/or contextual data to generate decisions for optimizing checkout operations. The decisions may include a simple reboot of certain underperforming checkout devices. In some embodiments, if a checkout device is found to be consistently underperforming, the decisions produced by the ML models may include temporarily decommissioning the checkout device, and/or generating notifications for on-site staff to reroute customers to other more efficient checkout machines. In such configurations, the system may further generate alerts for the maintenance team, flagging that the checkout machine is in need of maintenance or replacement. In some embodiments, when inefficiencies are detected on certain components with a checkout device, the system may generate decisions to optimize these components. For example, if a scale's loss prevention mechanism is causing frequent false alarms or delays, the system may instruct the checkout device to temporarily deactivate the mechanism until a more permanent solution can be made.

At block 340, the computing system translates the decision into executable commands, and transmits the commands to the appropriate checkout devices for implementation.

Figure 4:
FIG. 4 depicts an example method for updating trained decision-making models based on observed post-implementation performance, according to some embodiments of the present disclosure.
Figure 4:
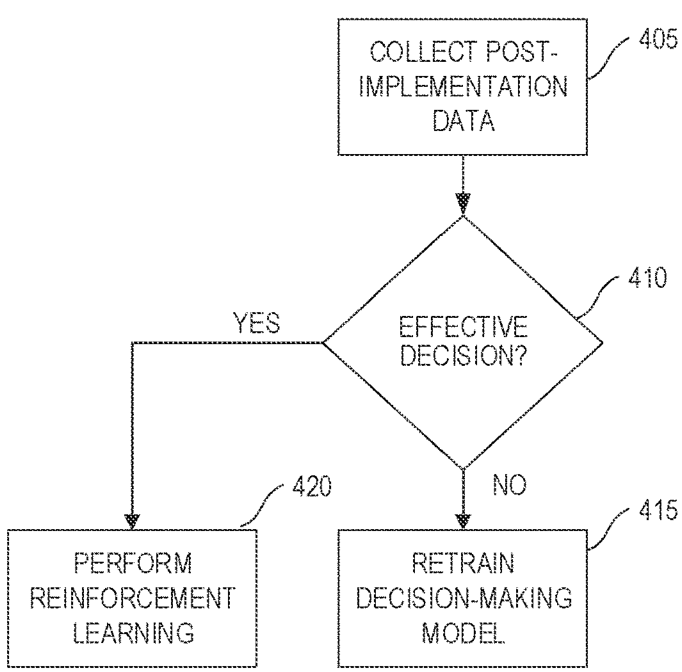

FIG. 4 depicts an example method 400 for updating trained decision-making models based on observed post-implementation performance, according to some embodiments of the present disclosure. In some embodiments, the method 400 may be performed by one or more computing devices (e.g., a system that continues to monitor demand data and/or capacity data after implementation and update models accordingly), such as the central server 190, the self-checkout machine 135, the mobile POS device 137, and the self-service kiosk station 139 as illustrated in FIGS. 1A-1B, and/or the computing device 600 as illustrated in FIG. 6.

At block 405, the computing system (e.g., 190 of FIG. 1B) collects data (e.g., visual data 215-2, sensor data 220-2, and component-level capacity data 210-2 of FIG. 2) on checkout demand and capacity after the implementation of the decision (recommended by trained ML models). In some embodiments, the system may process the collected data to determine certain parameters/metrics (e.g., demand data 240-2, or capacity data 235-2 of FIG. 2), such as the queue lengths, the average waiting time, the overall capacity of each checkout device, and the like.

At block 410, the computing system evaluates the effectiveness of the decision by comparing the post-implementation data (e.g., demand data 240-2, or capacity data 235-2 of FIG. 2) against the pre-implementation data (e.g., demand data 240-1, or capacity data 235-1 of FIG. 2). In some embodiments, the effectiveness of the decision may be indicated by positive changes in demand or capacity data, such as increased device capacities (or efficiency ratings), reduced queue lengths, reduced average waiting time, and the like. If the comparison reveals improvements—such as positive changes in demand or capacity data—the method 400 proceeds to block 420, where the computing system labels the implemented decision as successful, and/or uses the decision as a reinforcement signal in the ML model's learning. If the comparison reveals no improvements—such as negligible changes, a decline in device capacities (or efficiency ratings), an increased queue length, or increased average waiting time—the method 400 proceeds to block 415, where the computing system labels the implemented decision as unsuccessful, and retrains the models (e.g., adjusting parameters or algorithms) based on the decision. The retraining may create an iterative learning cycle that enables the system to continuously improve the accuracy and efficiency of models.

Figure 5:
FIG. 5 is a flow diagram illustrating an example method for executing decision-making models on collected data to generate optimization decisions, according to some embodiments of the present disclosure.
Figure 5:
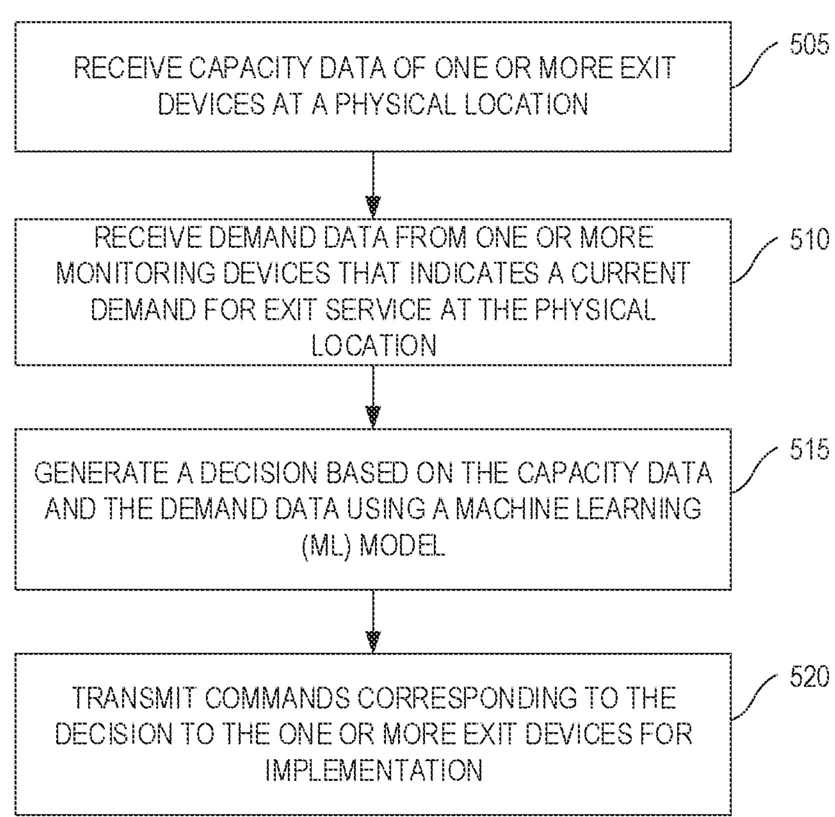

FIG. 5 is a flow diagram illustrating an example method 500 for executing decision-making models on collected data to generate optimization decisions, according to one embodiment disclosed herein.

At block 505, a computing system (e.g., 190 of FIG. 1B) receives capacity data (e.g., 235-1 of FIG. 2) of one or more exit devices (e.g., self-checkout machine 135, mobile POS device 137, and kiosk station 139 as illustrated in FIG. 1A) at a physical location. In some embodiments, the one or more exit devices at the physical location may comprise a self-checkout machine. In some embodiments, the self-checkout machine may comprise one or more individual devices including at least one of a monitor, a scanner, a printer, a scale, or a pin pad, and a capacity of the self-checkout machine may be determined based on capacities reported by each of the one or more individual devices.

At block 510, the computing system receives demand data (e.g., 240 of FIG. 2) from one or more monitoring devices (e.g., queue-monitoring cameras 130, entrance cameras, in-store cameras 185, and cameras/sensors 120 of smart shopping carts 115 as illustrated in FIGS. 1A and 11B) that indicates a current demand for exit service at the physical location. In some embodiments, the demand data may comprise at least one of a count of individuals awaiting in a checkout queue, a quantity of products within each cart pending checkout, a count of individuals entering the physical location, or a count of individuals present in the store but not in the checkout queue. In some embodiments, the demand data may further indicate a trend of the current demand for exit service based on the count of individuals entering the physical location and the count of individuals present in the store but not in the checkout queue. In some embodiments, the monitoring devices may comprise at least one of a camera installed at the physical location and configured to monitor activities within the physical location, or a camera or sensor placed on a cart and configured to detect objects within the cart.

At block 515, the computing system generates a decision (e.g., 250 of FIG. 2) based on the capacity data (e.g., 235-1 of FIG. 2) and the demand data (e.g., 240-1 of FIG. 2) using a machine learning (ML) model. In some embodiments, the decision comprises at least one of rebooting the one or more exit devices, adjusting settings of the one or more exit devices, or turning off the one or more exit devices for maintenance or replacement.

At block 520, the computing system transmits commands corresponding to the decision to the one or more exit devices for implementation.

In some embodiments, the computing system may further monitor changes in at least one of the demand data or the capacity data after the implementation of the decision, and retrain the ML model based on the changes and the decision.

In some embodiments, the computing system may further extract contextual data by processing supplemental information, where the contextual data includes at least one of an identifier of peak hour, an identifier of off-peak hour, an identifier of a weekday, an identifier of a weekend, or an identifier of a special event, and generate the decision based on the capacity data, demand data, and the contextual data using the machine learning (ML) model.

In some embodiments, the ML model may be trained using historical pre-implementation condition data as inputs, and using corresponding implemented decisions that historically led to an improved operational efficiency as target outputs. In some embodiments, the ML model may learn to correlate the historical pre-implementation condition data to the implemented decisions. In some embodiments, the historical pre-implementation condition data may comprise at least one of historical capacity data of the one or more exit devices at the physical location, or historical demand data indicating immediate demand for exit service at the physical location.

FIG. 6 depicts an example computing device 600 configured to perform various aspects of the present disclosure, according to some embodiments of the present disclosure. Although depicted as a physical device, in some embodiments, the computing device 600 may be implemented using virtual device(s), and/or across a number of devices (e.g., in a cloud environment). The computing device 600 can be embodied as any computing device, such as the central server 190, the self-checkout machine 135, the mobile POS device 137, and the self-service kiosk station 139 as illustrated in FIGS. 1A-1B, the data processing component 225, and the decision-making component 245 as illustrated in FIG. 2.

As illustrated, the computing device 600 includes a CPU 605, memory 610, storage 615, one or more network interfaces 625, and one or more I/O interfaces 620. In the illustrated embodiment, the CPU 605 retrieves and executes programming instructions stored in memory 610, as well as stores and retrieves application data residing in storage 615. The CPU 605 is generally representative of a single CPU and/or GPU, multiple CPUs and/or GPUs, a single CPU and/or GPU having multiple processing cores, and the like. The memory 610 is generally considered to be representative of a random access memory. Storage 615 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 635 (such as keyboards, monitors, etc.) are connected via the I/O interface(s) 620. Further, via the network interface 625, the computing device 600 can be communicatively coupled with one or more other devices and components (e.g., via a network, which may include the Internet, local network(s), and the like). As illustrated, the CPU 605, memory 610, storage 615, network interface(s) 625, and I/O interface(s) 620 are communicatively coupled by one or more buses 630.

In the illustrated embodiment, the memory 610 includes a data processing component 650, a decision-making component 655, and a command generation component 660. Although depicted as a discrete component for conceptual clarity, in some embodiments, the operations of the depicted component (and others not illustrated) may be combined or distributed across any number of components. Further, although depicted as software residing in memory 610, in some embodiments, the operations of the depicted components (and others not illustrated) may be implemented using hardware, software, or a combination of hardware and software.

In the illustrated embodiment, the data processing component 650 (which may correspond to the data processing component 225 of FIG. 2) is configured to interpret and analyze data collected from various IoT devices within an enterprise location (e.g., a retail store). In some embodiments, the data processing component 650 may process visual data (e.g., 215-1 of FIG. 2) (e.g., using image recognition techniques) collected from cameras strategically installed across the location or embedded within smart shopping carts. By processing the visual data, the data processing component may identify parameters such as the customer inflow (e.g., the number of customers entering the premises), the queue length (e.g., the number of customers waiting in checkout lines), the number of customers scattered within the shopping areas but not yet proceeding to checkout, and the number and/or type of items each cart contains. In some embodiments, when smart shopping carts are equipped with sensors or code readers (e.g., RFID readers, barcode scanners, weight sensors), the data processing component 650 may analyze the sensor data (e.g., 220-1 of FIG. 2) to track the contents (e.g., the number and/or type of items) of each cart. In some embodiments, the data processing component may be further configured to collect capacity data from each IoT-enabled checkout device. The capacity data may include component-level capacity metrics (e.g., 210-1 of FIG. 2) that reflect the performance of individual components within a checkout machine, such as scanners, scales, or printers. Upon receiving the component-level capacity data, the data processing component 225 may aggregate the data to compute an overall capacity (or efficiency rating) for each checkout device. In some embodiments, the aggregation may consider the weight of each component based on its importance or frequency of use. In some embodiments, the data processing component 650 may retrieve and analyze supplemental data (e.g., 205 of FIG. 2) to identify the contextual factors (e.g., peak time, off-peak time, weekend, weekday, occurrence of special events) that may affect customer patterns and/or checkout demand at the enterprise location.

In the illustrated embodiment, the decision-making component 655 (which may correspond to the decision-making component 245 of FIG. 2) is configured to execute trained ML models to perform predictive analysis. In some embodiments, the trained ML models may use the demand data (e.g., 240-1 of FIG. 2), the capacity data (e.g., 235-1 of FIG. 2), and/or the contextual data (e.g., 230 of FIG. 2) as inputs, and generate decisions or recommendations (e.g., 250 of FIG. 2) for optimizing the checkout operations at the enterprise location. In some embodiments, the decision-making component 655 may continue to collect demand data (e.g., 240-2 of FIG. 2) and/or capacity data (e.g., 235-2 of FIG. 2) after the implementation of the decisions. In some embodiments, the decision-making component 655 may evaluate the effectiveness of these decisions by comparing the post-implementation data with its corresponding pre-implementation data. Based on the evaluation, the decision-making component 655 may update the models. The iterative process ensures that the models evolve and adapt to changing conditions, therefore further improving their accuracy and efficiency.

In the illustrated embodiment, the command generation component 670 is configured to generate actionable instructions based on the decisions produced by the decision-making component 655. In some embodiments, the actionable instructions may refer to certain and executable commands that can be understood and performed by the relevant checkout devices. For example, in some embodiments, if the decision received from the decision-making component 655 indicates that one or more underperforming checkout machines should be rebooted, the command generation component 670 translates the decision into actionable commands, and transmits the commands to the affected checkout machines. In some embodiments, the command may be structured into a protocol format that checkout machines understand.

In the illustrated example, the storage 615 may include historical checkout data 675, trained ML models 680, and command records 685. In some embodiments, the historical checkout data may include historical pre-implementation condition data and corresponding implemented decisions. In some embodiments, the historical pre-implementation condition data may include, but is not limited to, the historical demand data, historical capacity data, and historical contextual data. In some embodiments, the historical checkout data 675 may be used for training or refining the decision-making models. In some embodiments, the aforementioned data may be saved in a remote database (e.g., 197 of FIG. 1B) that connects to the computing device 600 via a network (e.g., 195 of FIG. 1B).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to the described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not an advantage is achieved by a given embodiment is not limiting of the scope of the present disclosure. Thus, the following aspects, features, embodiments and advantages are merely illustrative and are not considered elements or limitations of the appended claims except where explicitly recited in a claim (s). Likewise, reference to the present disclosure shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a certain manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., system optimization applications) or related data available in the cloud. For example, the system optimization applications may perform data processing and ML model inference through a cloud computing infrastructure, and store the relevant results in a storage location in the cloud. Doing so allows a user to access this information from any computing system attached to a network connected to the cloud (e.g., the Internet).

While the foregoing is directed to embodiments of the present disclosure, other and further embodiments of the disclosure may be devised without departing from the basic scope thereof, and the scope thereof is determined by the claims that follow.

What is claimed is:

1. A method comprising:

receiving, by one or more processors, capacity data of one or more exit devices at a physical location;

receiving, by one or more processors, demand data from one or more monitoring devices that indicates a current demand for exit service at the physical location;

monitoring, by one or more processors, an efficiency metric, wherein the efficiency metric represents a speed at which one of the exit devices generates a weight for an item and an accuracy level of the weight;

processing, by one or more processors, the capacity data and the demand data using a machine learning (ML) model to identify correlations between the capacity data and the demand data;

determining, by one or more processors, using the machine learning (ML) model, the efficiency metric satisfies a threshold;

responsive to identifying the correlations between the capacity data and the demand data and determining the efficiency metric satisfies the threshold, generate a control output configured to drive one or more corrective actions;

transmitting the control output configured to drive the one or more corrective actions to the one or more exit devices for execution:

responsive to transmitting the control output configured to drive the one or more corrective actions, executing, by one or more processors, the one or more corrective actions at the one or more exit devices, wherein executing the one or more corrective actions at the one or more exit devices comprises:

automatically rebooting the one or more exit devices and automatically recalibrating a scale associated with the one or more exit devices.

2. The method of claim 1, further comprising:

monitoring changes in at least one of (i) the demand data or (ii) the capacity data after the execution in response to of the control output; and retraining the ML model based on the changes.

3. The method of claim 1, further comprising:

extracting contextual data by processing supplemental information, wherein the contextual data includes at least one of (i) an identifier of peak hour, (ii) an identifier of off-peak hour, (iii) an identifier of a weekday, (iv) an identifier of a weekend, or (v) an identifier of a special event; and generating the control output based on the capacity data, demand data, and the contextual data using the machine learning (ML) model.

4. The method of claim 1, wherein:

the one or more exit devices at the physical location comprises a self-checkout machine;

the self-checkout machine comprises one or more individual devices including at least one of a monitor, a scanner, a printer, a scale, or a pin pad; and an aggregated capacity of the self-checkout machine is determined based on capacities reported by each of the one or more individual devices.

5. The method of claim 1, wherein the demand data comprises at least one of (i) a count of individuals awaiting in a checkout queue, (ii) a quantity of products within each cart pending checkout, (iii) a count of individuals entering the physical location, or (iv) a count of individuals present in the physical location but not in the checkout queue.

6. The method of claim 5, wherein the demand data further indicates a trend of the current demand for exit service based on the count of individuals entering the physical location and the count of individuals present in the physical location but not in the checkout queue.

7. The method of claim 1, wherein the monitoring devices comprise at least one of (i) a camera installed at the physical location and configured to monitor activities within the physical location, or (ii) a camera or sensor placed on a cart and configured to detect objects within the cart.

8. The method of claim 1, wherein:

the ML model is trained using historical pre-implementation condition data as inputs, and using corresponding implemented decisions that historically led to an improved operational efficiency as target outputs; and the ML model learns to correlate the historical pre-implementation condition data to the implemented decisions.

9. The method of claim 8, wherein the historical pre-implementation condition data comprises at least one of (i) historical capacity data of the one or more exit devices at the physical location, or (2) historical demand data indicating immediate demand for exit service at the physical location.

10. A system comprising:

one or more memories collectively storing computer-executable instructions; and one or more processors configured to collectively execute the computer-executable instructions and cause the system to:

receive capacity data of one or more exit devices at a physical location;

receive demand data from one or more monitoring devices that indicates a current demand for exit service at the physical location;

monitor an efficiency metric, wherein the efficiency metric represents a speed at which one of the exit devices generates a weight for an item and an accuracy level of the weight;

process the capacity data and the demand data using a machine learning (ML) model to identify correlations between the capacity data and the demand data;

determine, using the machine learning (ML) model, the efficiency metric satisfies a threshold;

responsive to identifying the correlations between the capacity data and the demand data and determining the efficiency metric satisfies the threshold, generate a control output configured to drive one or more corrective actions;

transmit the control output configured to drive the one or more corrective actions to the one or more exit devices for execution:

responsive to transmitting the control output configured to drive the one or more corrective actions, executing, by one or more processors, the one or more corrective actions at the one or more exit devices, wherein executing the one or more corrective actions at the one or more exit devices comprises:

automatically rebooting the one or more exit devices and automatically recalibrating a scale associated with the one or more exit devices.

11. The system of claim 10, wherein the computer-executable instructions, when executed by the one or more processors, further cause the system to:

monitor changes in at least one of (i) the demand data or (ii) the capacity data after the execution in response to the control output; and retrain the ML model based on the changes.

12. The system of claim 10, wherein the computer-executable instructions, when executed by the one or more processors, further cause the system to:

extract contextual data by processing supplemental information, wherein the contextual data includes at least one of (i) an identifier of peak hour, (ii) an identifier of off-peak hour, (iii) an identifier of a weekday, (iv) an identifier of a weekend, or (v) an identifier of a special event; and generate the control output based on the capacity data, the demand data, and the contextual data using the machine learning (ML) model.

13. The system of claim 10, wherein:

the one or more exit devices at the physical location comprises a self-checkout machine;

the self-checkout machine comprises one or more individual devices including at least one of a monitor, a scanner, a printer, a scale, or a pin pad; and an aggregated capacity of the self-checkout machine is determined based on capacities reported by each of the one or more individual devices.

14. The system of claim 10, wherein the demand data comprises at least one of (i) a count of individuals awaiting in a checkout queue, (ii) a quantity of products within each cart pending checkout, (iii) a count of individuals entering the physical location, or (iv) a count of individuals present in the physical location but not in the checkout queue.

15. The system of claim 10, wherein the monitoring devices comprise at least one of (i) a camera installed at the physical location and configured to monitor activities within the physical location, or (ii) a camera or sensor placed on a cart and configured to detect objects within the cart.

16. The system of claim 10, wherein:

the ML model is trained using historical pre-implementation condition data as inputs, and using corresponding implemented decisions that historically led to an improved operational efficiency as target outputs; and the ML model learns to correlate the historical pre-implementation condition data to the implemented decisions.

17. The system of claim 16, wherein the historical pre-implementation condition data comprises at least one of (i) historical capacity data of the one or more exit devices at the physical location, or (2) historical demand data indicating immediate demand for exit service at the physical location.

18. A computer program product, comprising: computer-readable storage mediums having computer-readable program code executable to cause the computer program product to:

receive capacity data of one or more exit devices at a physical location;

receive demand data from one or more monitoring devices that indicates a current demand for exit service at the physical location;

monitor an efficiency metric, wherein the efficiency metric represents a speed at which one of the exit devices generates a weight for an item and an accuracy level of the weight;

process the capacity data and the demand data using a machine learning (ML) model to identify correlations between the capacity data and the demand data;

determine, using the machine learning (ML) model, the efficiency metric satisfies a threshold;

responsive to identifying the correlations between the capacity data and the demand data and determining the efficiency metric satisfies the threshold, generate a control output configured to drive one or more corrective actions;

transmit the control output configured to drive the one or more corrective actions to the one or more exit devices for execution:

responsive to transmitting the control output configured to drive the one or more corrective actions, executing, by one or more processors, the one or more corrective actions at the one or more exit devices, wherein executing the one or more corrective actions at the one or more exit devices comprises:

automatically rebooting the one or more exit devices and automatically recalibrating a scale associated with the one or more exit devices.

* * * * *